(12) United States Patent
Scott

(10) Patent No.: US 11,517,411 B2
(45) Date of Patent: Dec. 6, 2022

(54) ARBITRARY MOTION TOOTHBRUSH

(71) Applicant: Nortman D. Scott, Sunrise, FL (US)

(72) Inventor: Nortman D. Scott, Sunrise, FL (US)

( * ) Notice: Subject to any disclaimer, the term of this patent is extended or adjusted under 35 U.S.C. 154(b) by 299 days.

(21) Appl. No.: 16/643,639

(22) PCT Filed: Aug. 30, 2018

(86) PCT No.: PCT/US2018/048777
§ 371 (c)(1),
(2) Date: Mar. 2, 2020

(87) PCT Pub. No.: WO2019/046545
PCT Pub. Date: Mar. 7, 2019

(65) Prior Publication Data
US 2020/0205950 A1    Jul. 2, 2020

Related U.S. Application Data

(60) Provisional application No. 62/551,816, filed on Aug. 30, 2017.

(51) Int. Cl.
| | | |
|---|---|---|
| *A61C 17/34* | (2006.01) |
| *A61C 17/22* | (2006.01) |
| *A46B 9/04* | (2006.01) |
| *A46B 13/02* | (2006.01) |
| *A46B 15/00* | (2006.01) |
| *A61C 15/04* | (2006.01) |

(52) U.S. Cl.
CPC .............. *A61C 17/221* (2013.01); *A46B 9/04* (2013.01); *A46B 13/02* (2013.01); *A46B 15/0071* (2013.01); *A46B 15/0073* (2013.01); *A61C 15/047* (2013.01); *A61C 15/048* (2013.01); *A61C 17/3463* (2013.01); *A61C 17/3472* (2013.01); *A61C 2204/002* (2013.01)

(58) Field of Classification Search
CPC .......... A61C 17/221; A61C 17/22; A46B 9/04
See application file for complete search history.

(56) References Cited

U.S. PATENT DOCUMENTS

| | | | | |
|---|---|---|---|---|
| 5,842,244 A | * | 12/1998 | Hilfinger ................ | A61C 17/22 15/28 |
| 2001/0014990 A1 | * | 8/2001 | Fritsch ................. | A61C 17/222 15/28 |
| 2010/0162501 A1 | * | 7/2010 | Kressner ................ | A61C 17/22 15/22.1 |

* cited by examiner

*Primary Examiner* — Michael D Jennings
(74) *Attorney, Agent, or Firm* — Greenspoon Marder LLP; Justin F. McNaughton

(57) ABSTRACT

A method and apparatus permitting arbitrary, relative motions of a distal end of a toothbrush or flosser with respect to a handle with real-time selectable motions. The toothbrush has a handle and a post, with a mechanism mechanically coupling the handle to the post permitting relative translational movement of the post with respect to the handle.

21 Claims, 18 Drawing Sheets

ARBITRARY MOTION TOOTHBRUSH

CROSS REFERENCE TO RELATED APPLICATIONS

This application claims the benefit of PCT Application No. PCT/US2018/048777 filed on Aug. 30, 2018, which claims benefit of U.S. Prov. Pat. App. No. 62/551,816 filed on Aug. 30, 2017, the entirety of which is hereby incorporated by reference.

BACKGROUND OF THE INVENTION

Field of the Invention

The present invention relates generally to the field of toothbrushes, and more specifically, to the field of electric toothbrushes. Embodiments disclosed herein permit arbitrary, relative motions of a distal end of a toothbrush and/or flosser with respect to a handle. Said motions are selectable by a user in real time by a selection switch. An elongated body is used as a handle, and smaller elongated member serves as the toothbrush post. A mechanism mechanically couples said handle to said toothbrush post member permitting relative movement of said toothbrush post with respect to said handle.

Early toothbrushes have existed for thousands of years; however the more familiar implementations used today originated in the early 20th century. Throughout the years, many different brushing techniques have evolved. Generally, the movement of a manual toothbrush by a user, when brushing their teeth, may be decomposed into two predominant motions. This includes a comparatively high amplitude (20-30 mm displacement), low frequency (0.2-0.5 Hz) 'gross' motion, and a lower amplitude (3-5 mm), higher frequency (2-5 Hz) 'fine' motion. The 'gross' motion allows the user to position the bristle head in the correct general area of the mouth to reach all teeth surfaces, while the 'fine' motion typically dislodges particulate debris in each specific area.

Unfortunately, the combination of these 'gross' and 'fine' motions while brushing teeth may not be sufficient for removing all debris. Microscopic food particles are not easily removed, and may lead to tooth decay if left in place over time. Additionally, some users may not want to exert the required effort when brushing, whereby the gross and/or fine motions are not performed correctly, leading to insufficient teeth cleaning. Therefore, electric toothbrushes have been developed to aid with tooth brushing and removal of additional food particles that are too difficult to remove with manual and/or improper techniques alone.

Initial electric toothbrushes were marketed as 'high end' luxury products, limiting wide-scale adoption. However, there has been enormous market growth in this segment over the past ten years. This is due to more recent introductions of lower-cost electric toothbrushes, targeting a wider cohort of budget-conscious consumers. These lower cost electric toothbrushes, such as illustrated in U.S. Pat. No. 6,000,083, differ from their more expensive predecessors. These cheaper variants use simplified mechanisms as compared to the more expensive versions. Typically, lower priced electric toothbrushes provide a static and dynamic region of bristles as part of the toothbrush 'head'. The static region does not move with respect to the toothbrush handle, while the dynamic region motion augments the aforementioned 'gross' and 'fine' motions with a higher bandwidth (10-20 Hz), lower amplitude (0.5-1 mm displacement) motion. This 'very-fine' motion is typically implemented with a circular shaped area of bristles which oscillates in an angular manner, or with a rectangular region that vibrates from side-to-side. In both cases, the amplitude of the motion is typically much smaller than a typical users' 'fine' motion, and the frequency is much higher, i.e. 10-20 Hz versus 2-3 Hz.

When using these prior-art electric toothbrushes, the user must still contribute the 'gross' and 'fine' motion of the toothbrush, possibly resulting in user fatigue. It would be preferred if the amount of effort required by the user was reduced. Additionally, the 'very-fine' oscillating and/or vibrating motion has a fixed trajectory; it would be preferred if the user could request a modified oscillation and/or vibration trajectory from the toothbrush based upon preference and/or specific mouth regions. For example, prior art electric toothbrushes such as U.S. Pat. Nos. 6,000,083, 7,421,753 B2, and 7,451,514 B2 all describe electric toothbrushes that generate 'very-fine' oscillating and/or vibrating motions of a fixed trajectory; there is no method described to alter the motion trajectory based upon user preference.

Thus there has existed a long-felt need for an inexpensive toothbrush that allows for altering motion trajectory based upon immediate user preference.

SUMMARY OF THE INVENTION

The current disclosure provides just such a solution by teaching arbitrary, relative motions of a distal end of a toothbrush and/or flosser with respect to a handle. Said motions are selectable by a user in real time by a selection switch.

The present embodiments of the invention are directed to an electric toothbrush. In one embodiment, the electric toothbrush disclosed herein includes an elongated body used as a handle, and smaller elongated member serving as the toothbrush post. Additionally, a mechanism mechanically couples said handle to said toothbrush post member. The inclusion of said mechanism permits relative movement of said toothbrush post with respect to said handle.

There are numerous advantages to using said mechanism for coupling said handle to said post member. First, the very high frequency motions (>10 Hz) and the mid range frequency motions (3-5 Hz) may now be executed by said mechanism, eliminating the need for the user to perform these motions. Second, the versatility of said mechanism permits real-time modifications of said toothbrush post head trajectory with respect to said handle. For example, it may be desirable to have said toothbrush post travel in a rectilinear motion while brushing molars, a planar circular motion while brushing front teeth, and a transverse circular motion to massage the gum line. The present invention permits said real time trajectory adjustments in-situ.

It is an object of the current disclosure to provide a toothbrush allowing immediate alteration of motion trajectory based upon user preference.

It is another object of the current disclosure to provide an electric toothbrush with real-time modification of the toothbrush post head trajectory.

It is a further object of this disclosure to provide a method of brushing teeth using a powered toothbrush with real-time user-selectable motion trajectories for the post head of the toothbrush.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future. Furthermore, the use of plurals can also refer to the singular, including without limitation when a term refers to one or more of a particular item; likewise, the use of a singular term can also include the plural, unless the context dictates otherwise.

The presence of broadening words and phrases such as "one or more," "at least," "but not limited to" or other like phrases in some instances shall not be read to mean that the narrower case is intended or required in instances where such broadening phrases may be absent. Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

As used herein, the term toothbrush means an oral hygiene instrument used to clean portions of a user's mouth, such as the teeth, gums, and tongue, and may include a bristle head, flossing head, or other elongated member that is inserted into the user's mouth for cleaning.

There has thus been outlined, rather broadly, the more important features of the invention in order that the detailed description thereof may be better understood, and in order that the present contribution to the art may be better appreciated. There are additional features of the invention that will be described hereinafter and which will also form the subject matter of the claims appended hereto. The features listed herein and other features, aspects and advantages of the present invention will become better understood with reference to the following description and appended claims.

BRIEF DESCRIPTION OF THE FIGURES

The accompanying drawings, which are incorporated in and form a part of this specification, illustrate embodiments of the invention or prior art, and together with the description, serve to explain the principles of this invention.

DETAILED DESCRIPTION OF THE INVENTION

Figure 1:
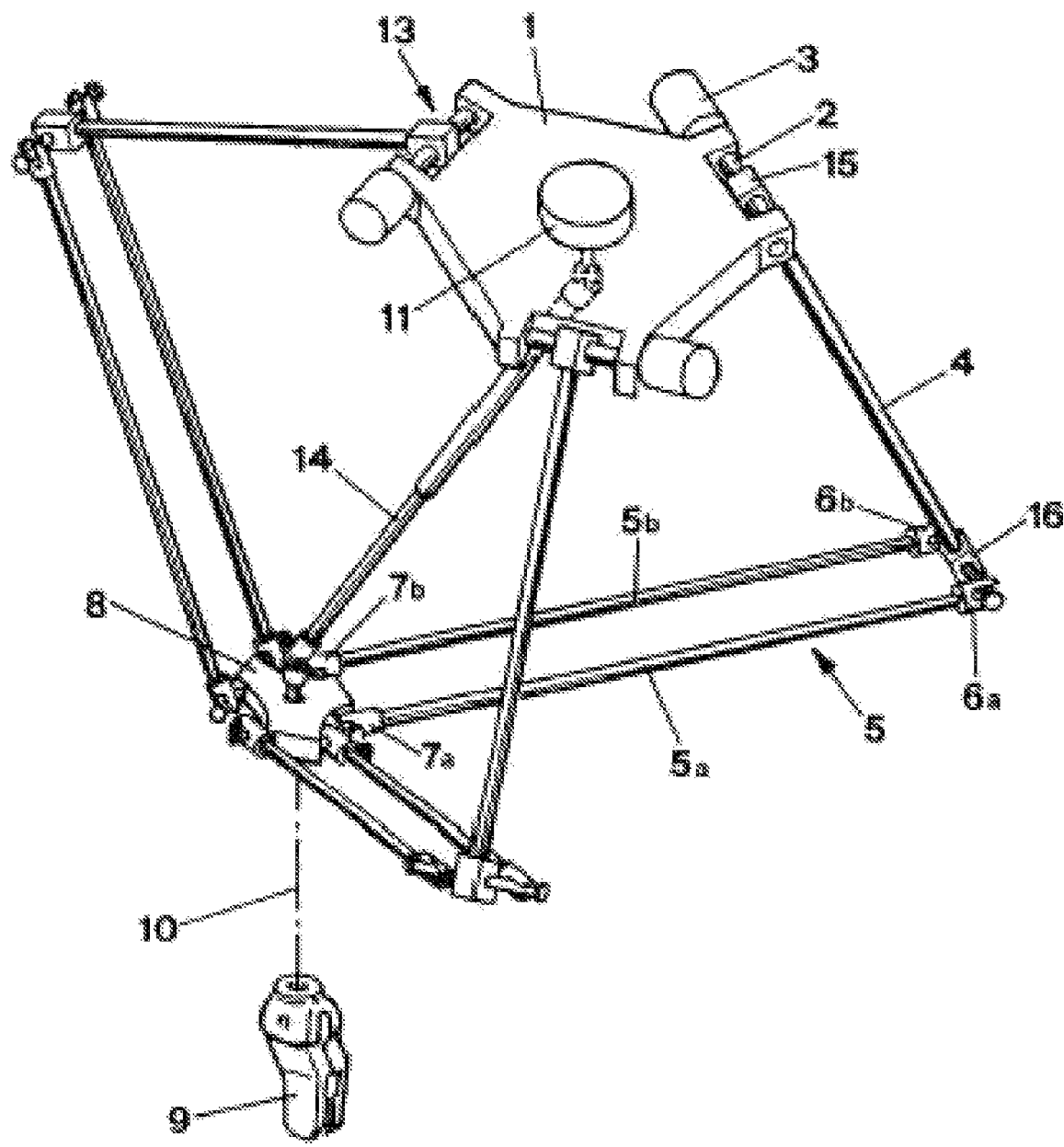
FIG. 1 is a prior art embodiment of a mechanism as presented in U.S. Pat. No. 4,927,582, commonly referred to as a "Delta" robot.

Many aspects of the invention can be better understood with the references made to the drawings below. The components in the drawings are not necessarily drawn to scale. Instead, emphasis is placed upon clearly illustrating the components of the present invention. Moreover, like reference numerals designate corresponding parts through the several views in the drawings.

FIG. 1 is a prior-art embodiment of the mechanism as presented in U.S. Pat. No. 4,927,582, commonly referred to as a "Delta" robot.

Figure 2:
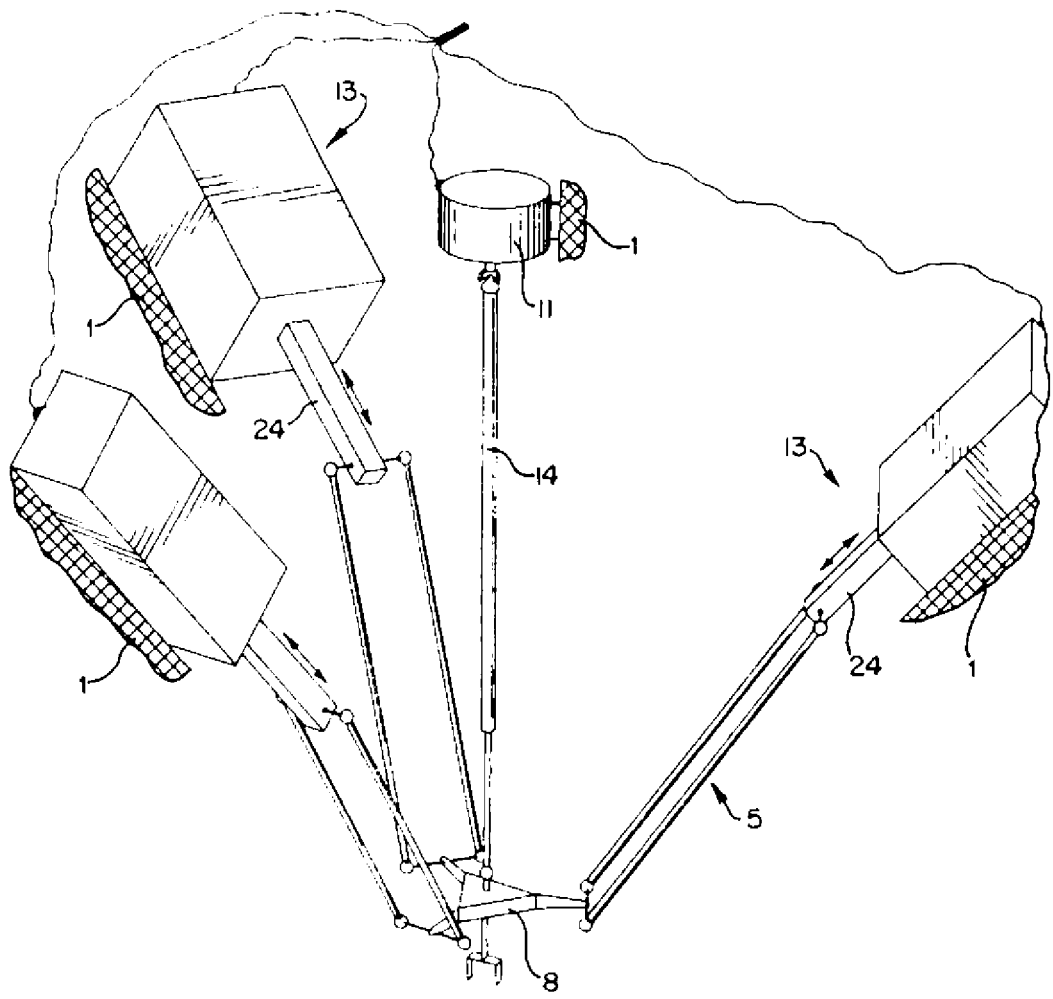
FIG. 2 is another prior art embodiment of the mechanism as presented in U.S. Pat. No. 4,976,582 showing actuated joints moving in a linear motion instead of a revolute motion, commonly referred to as a "Linear Delta" robot.

FIG. 2 is another prior art embodiment of the mechanism as presented in U.S. Pat. No. 4,976,582 showing actuated joints moving in a linear motion instead of a revolute motion, commonly referred to as a "Linear Delta" robot. In this embodiment, the actuated joints move in a linear motion instead of a revolute motion. The end effector platform has the same mobility as the primary embodiment. This image is from 'FIG. 5' of the original U.S. Pat. No. 4,976,582 patent. This arrangement is now commonly called a 'Linear Delta' robot.

Figure 3:
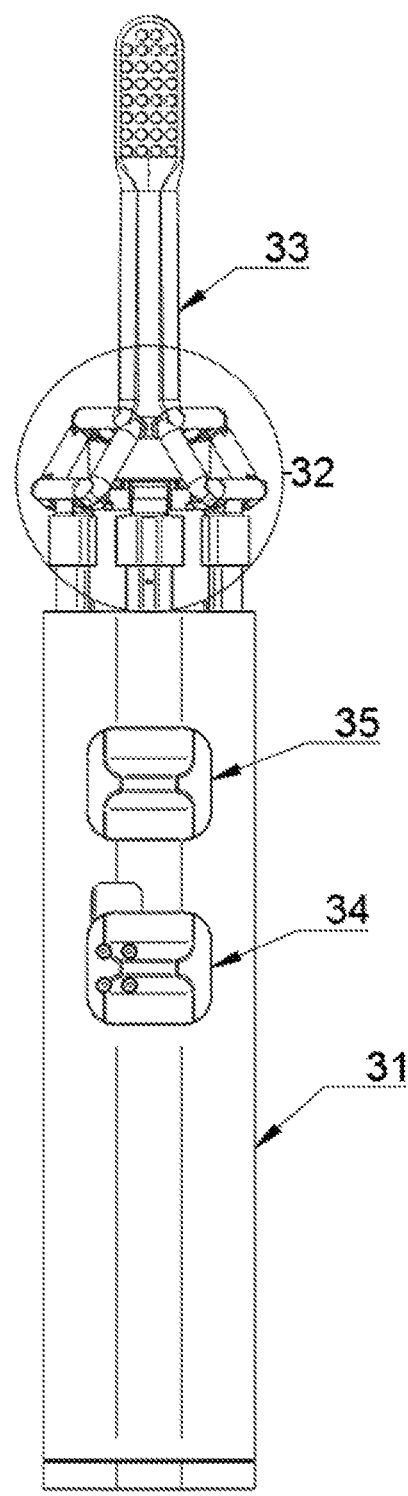
FIG. 3 is a front view of a toothbrush according to selected embodiments of the current disclosure.

FIG. 3 is a front view of a toothbrush according to selected embodiments of the current disclosure. The main elongated body 31 serves as the mechanism fixed body. Components 32 form the mechanism. The elongated body 33 is the movable member. The mode selection switch 34 allows the user to select between different spatial trajectory patterns of movable member 33 with respect to the fixed body 31. Enable/disable/reverse switch 35 allows the user to turn power on/off and to reverse the direction of travel.

Figure 4:
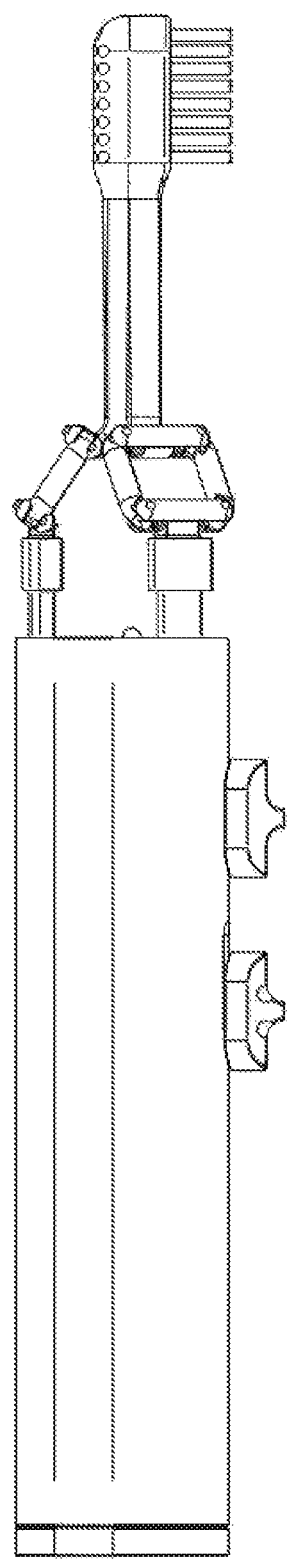
FIG. 4 is a side view of a toothbrush according to selected embodiments of the current disclosure.

FIG. 4 is a side view of a toothbrush according to selected embodiments of the current disclosure.

Figure 5:
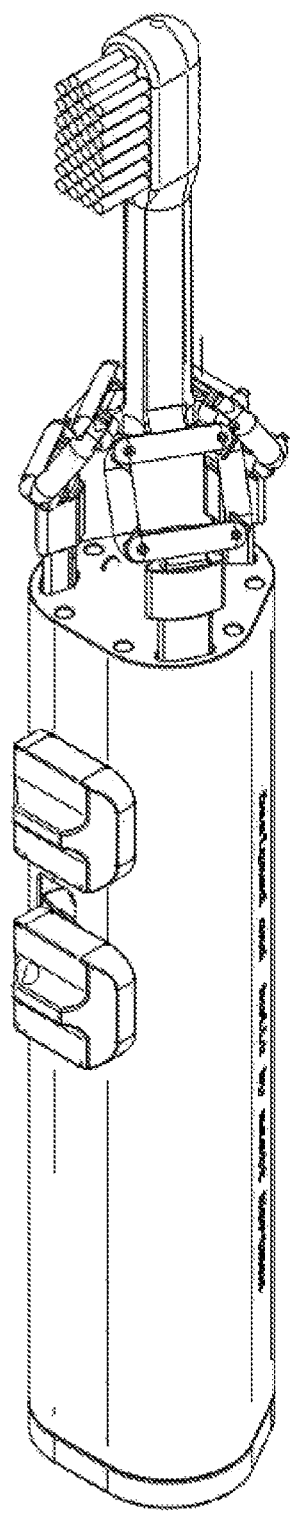
FIG. 5 is an isometric view of a toothbrush according to selected embodiments of the current disclosure.

FIG. 5 is an isometric view of a toothbrush according to selected embodiments of the current disclosure.

Figure 6:
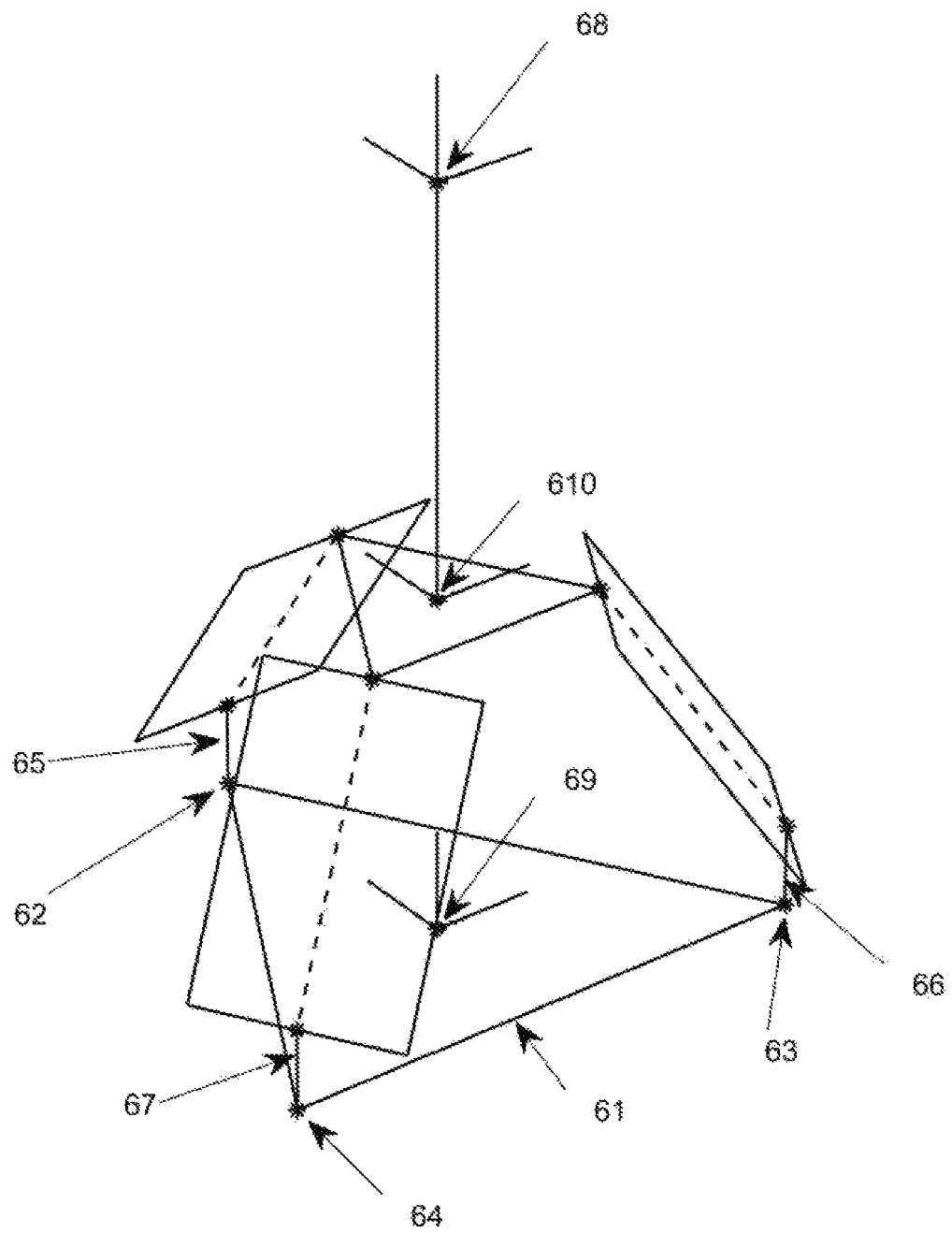
FIG. 6 is a line drawing of a kinematic model of a mechanism for a toothbrush according to selected embodiments of the current disclosure.

FIG. 6 is a line drawing of a kinematic model of a mechanism for a toothbrush according to selected embodiments of the current disclosure. The fixed body 61 is rigidly related to the joint actuation axes J1 (62), J2 (63), and J3 (64). The displacements along J1 (65), along J2 (66), and along J3 (67) move in a linear motion with respect to respective actuation axes 62, 63, 64.
Note that the movable body frame 610 of the end effector (EE) translates in three distinct degrees of freedom with respect to the robot base (RB) frame 69 based on joint displacements 65, 66, and 67. Note that the tool center point frame (TCP) 68 is rigidly related to the moving frame 610.

Figure 7:
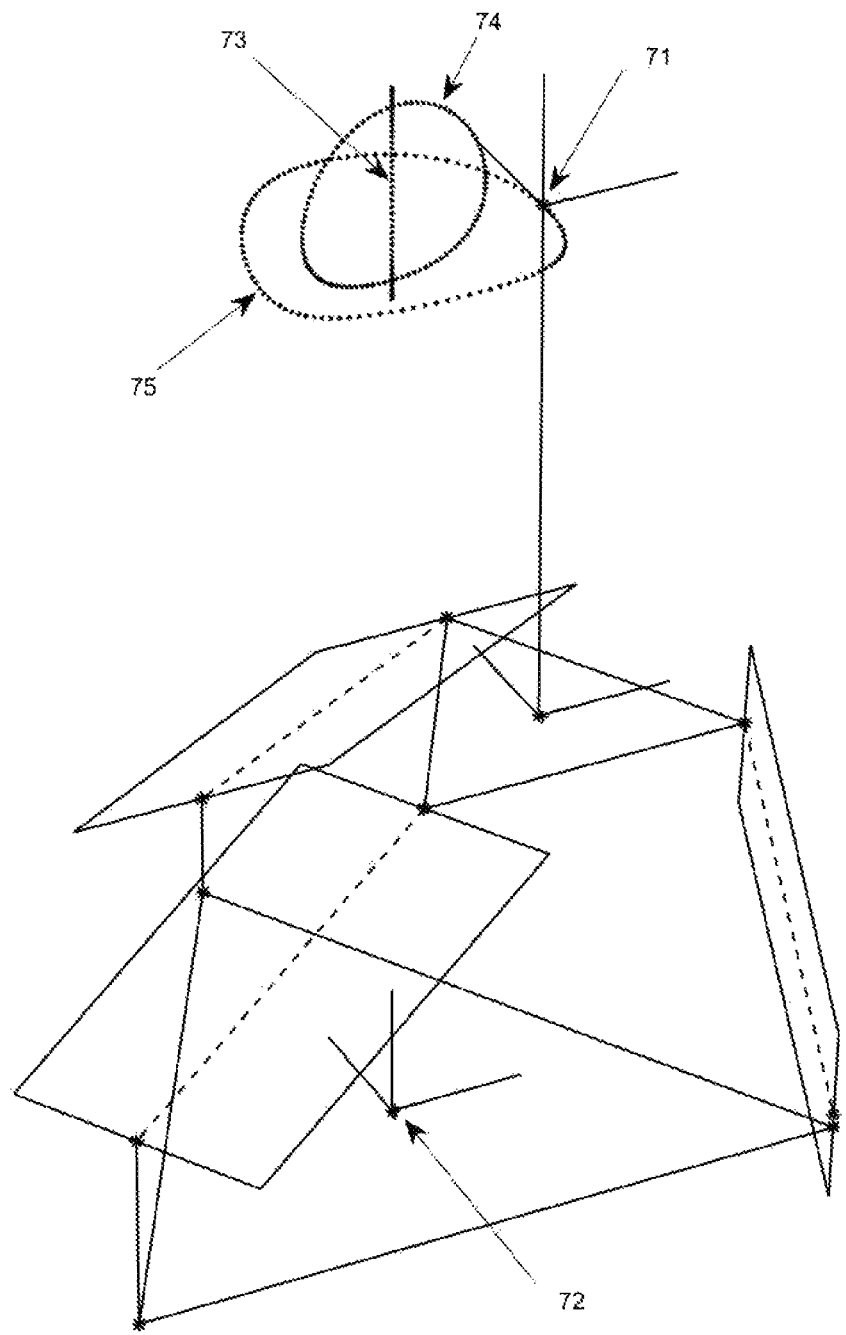
FIG. 7 is a line drawing illustrating a subset of possible spatial motion trajectories of the tool center point frame with respect to the robot base frame of a toothbrush according to selected embodiments of the current disclosure.

FIG. 7 is a kinematic model line drawing illustrating a subset of possible spatial motion trajectories of the tool center point frame with respect to the robot base frame of a toothbrush according to selected embodiments of the current disclosure. FIG. 7 illustrates a subset of possible spatial motion trajectories of the TCP frame 71 with respect to the robot base frame 72. Note for trajectory 73 the origin of the TCP frame 71 moves in a linear motion path. Note for trajectory 74 the origin of the TCP 71 frame moves in an elliptical motion path oriented primarily in a plane perpendicular to the base frame 72 XY plane. Note for trajectory 75 the origin of the TCP frame moves in a circular motion primarily in a plane parallel to the robot base 72 XY plane.

Figure 8:
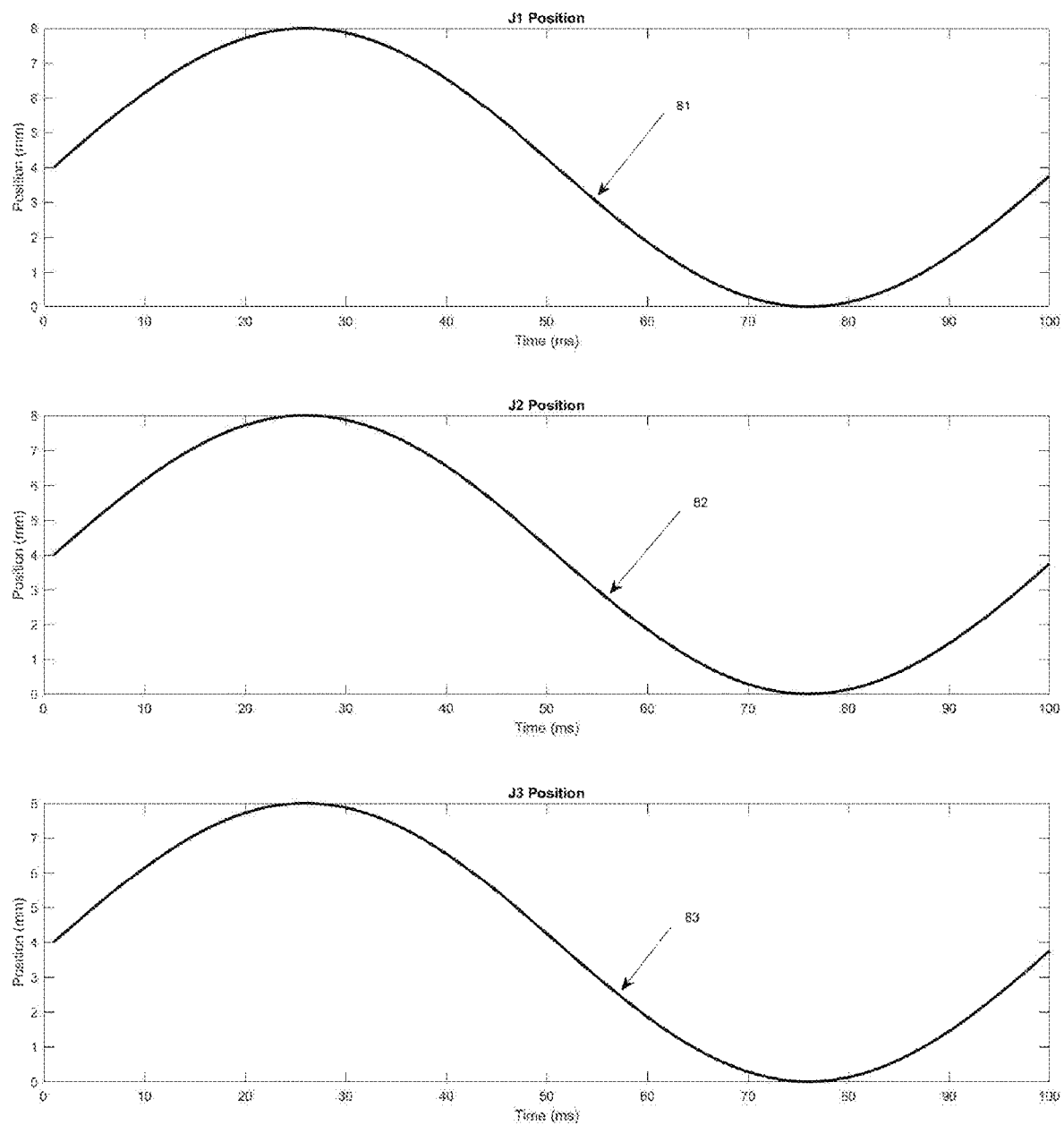
FIG. 8 shows time series plots for joint displacements corresponding to straight line tool center point motion along the z-axis according to selected embodiments of the current disclosure.

FIG. 8 shows time series plots for joint displacements corresponding to straight line tool center point motion along the z-axis according to selected embodiments of the current disclosure. Plot 81 shows the joint J1 linear displacement vs. time, plot 82 shows the joint J2 linear displacement vs. time, and plot 83 shows the joint J3 linear displacement vs. time. Note for this selected embodiment of the current disclosure, all joint displacements are sinusoidal and are all in phase.

Figure 9:
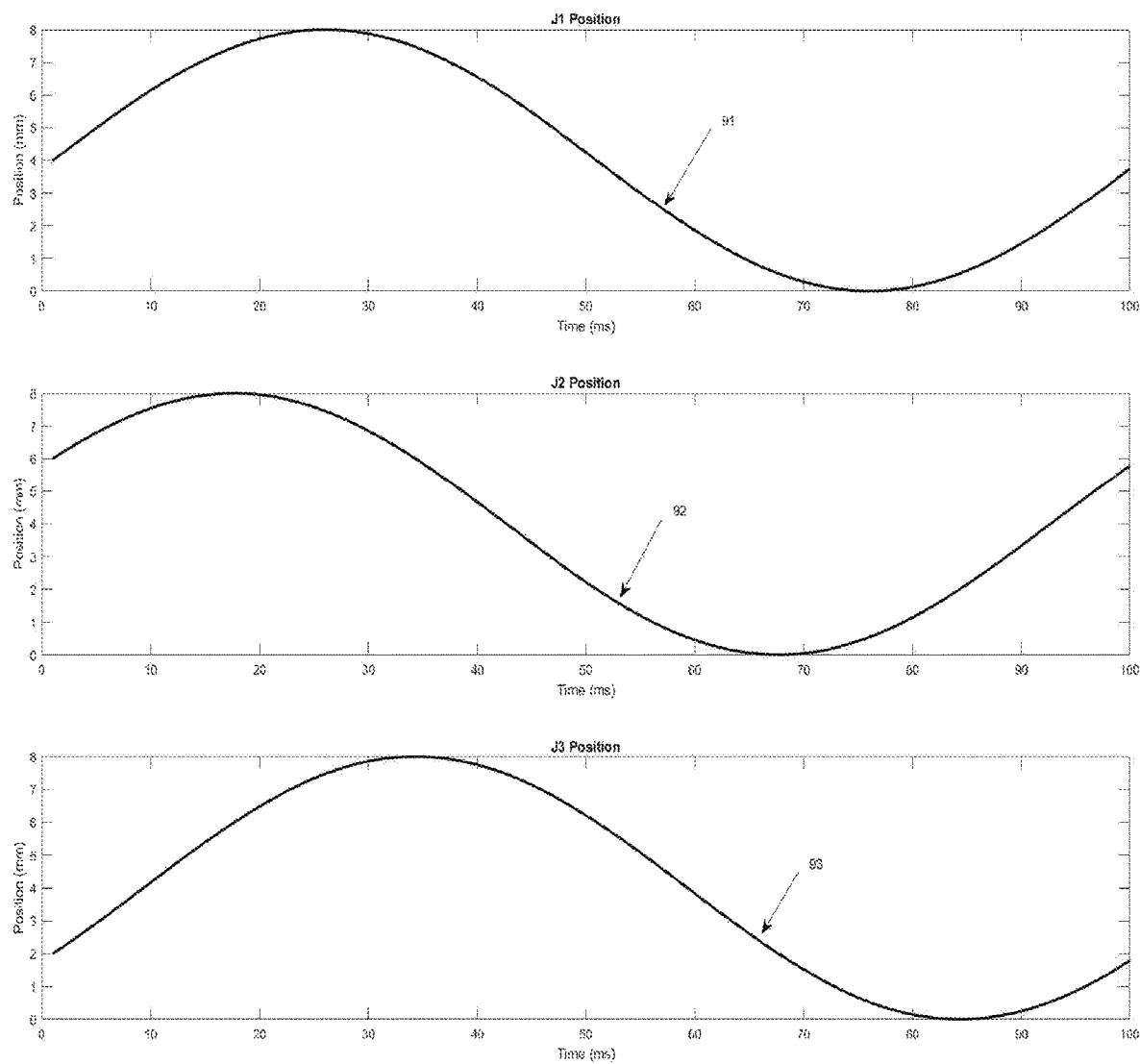
FIG. 9 shows time series plots for joint displacements corresponding to elliptical x-z plane motion of the tool center point frame origin according to selected embodiments of the current disclosure.

FIG. 9 shows time series plots for joint displacements corresponding to elliptical x-z plane motion of the tool center point frame origin according to selected embodiments of the current disclosure. Plot 91 shows the joint J1 linear displacement vs. time, plot 92 shows the joint J2 linear displacement vs. time, and plot 93 shows the joint J3 linear displacement vs. time. Note that joint J2 displacement lags joint J1 by 30° and joint J3 displacement leads joint J1 by 30°.

Figure 10:
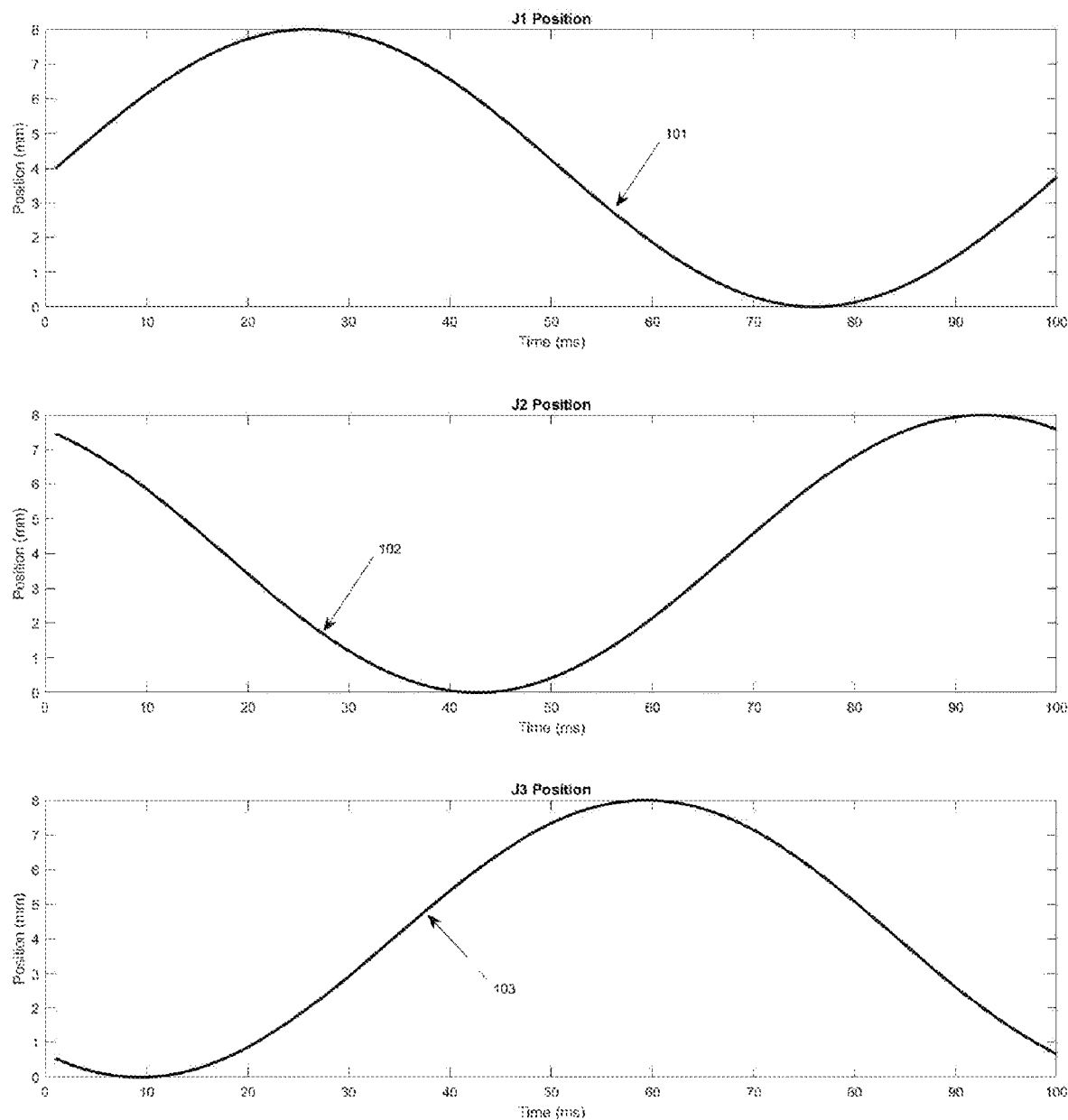
FIG. 10 shows time series plots for joint displacements corresponding to circular motion of the tool center point frame origin, primarily in a plane parallel to the x-y plane of the robot base frame according to selected embodiments of the current disclosure.

FIG. 10 shows time series plots for joint displacements corresponding to circular motion of the tool center point frame origin, primarily in a plane parallel to the x-y plane of the robot base frame according to selected embodiments of the current disclosure. Plot 101 shows the joint J1 linear displacement vs. time, plot 102 shows the joint J2 linear displacement vs. time, and plot 103 shows the joint J3 linear displacement vs. time. Note that joint J2 displacement leads joint J1 by 240° and joint J3 displacement leads joint J1 by 120°.

Figure 11:
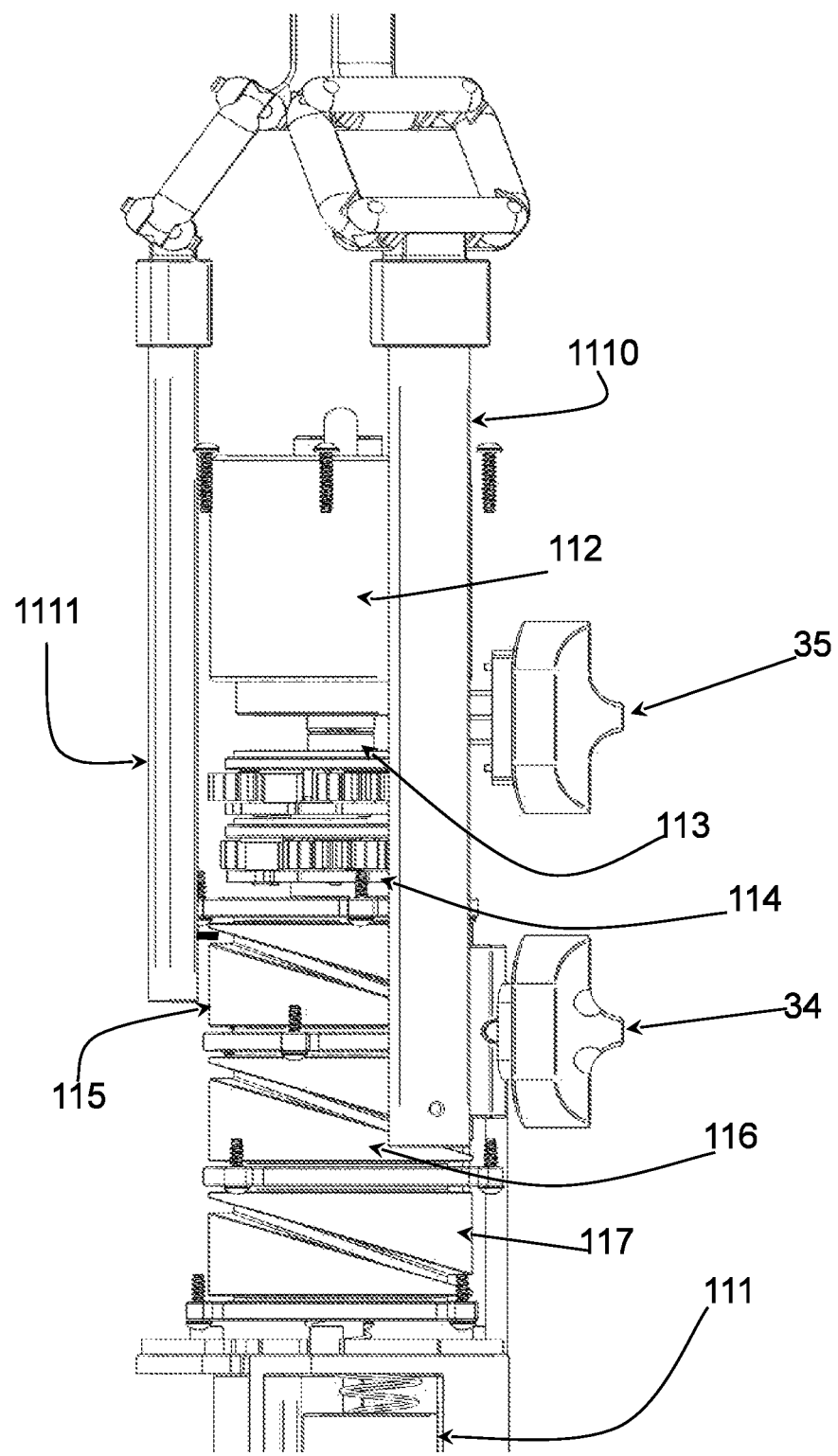
FIG. 11 is a partial side view of interior components of a toothbrush according to selected embodiments of the current disclosure.

FIG. 11 is a partial side view of interior components of a toothbrush according to selected embodiments of the current disclosure. This includes a partial view of battery 111, direct current motor 112, motor output gear 113, dual stage planetary gearbox 114, barrel cam 115, barrel cam 116, and barrel cam 117. Note J1 actuator rod 1110 is operatively coupled to barrel cam 116, J2 actuator rod 1111 is operatively coupled to barrel cam 115, and J3 actuator rod 1112 (not shown) is operatively coupled to barrel cam 117. Additional components include power/direction switch assembly 34 and the motion mode switch assembly 35.

Figure 12:
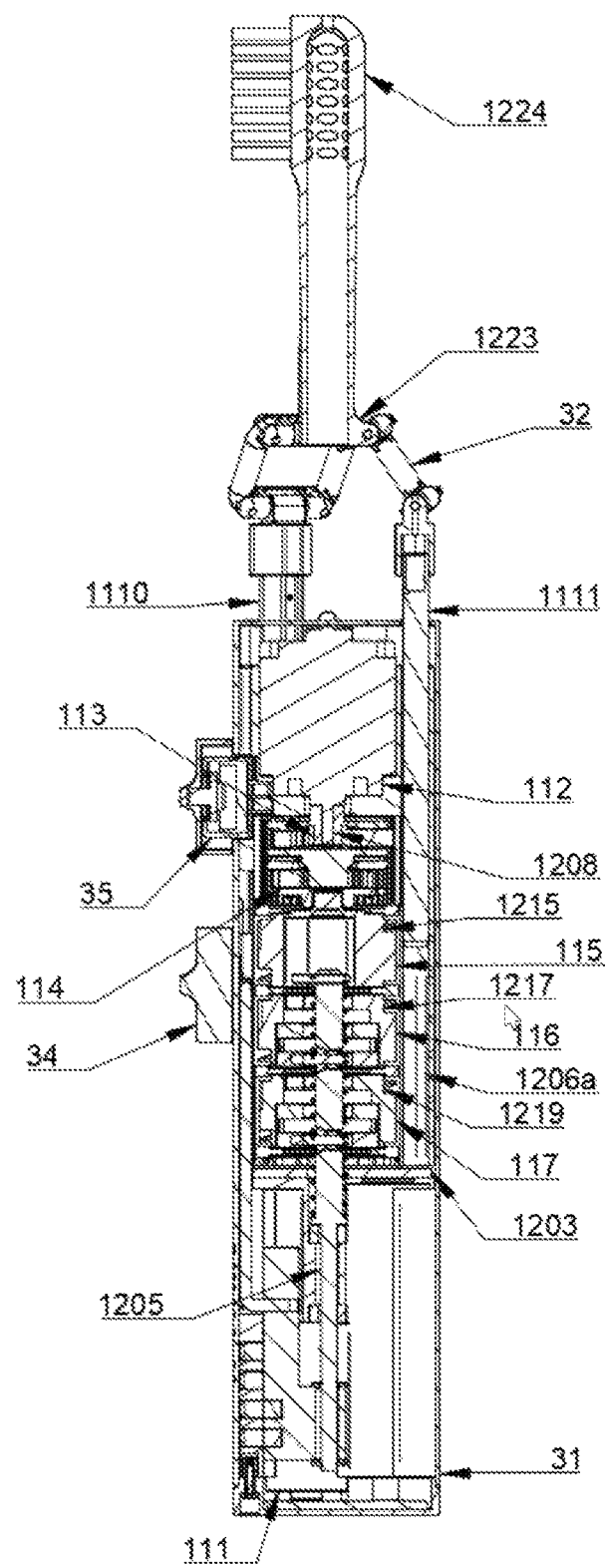
FIG. 12 is a cross-section view of a toothbrush according to selected embodiments of the current disclosure.

FIG. 12 is a cross-section view of a toothbrush according to selected embodiments of the current disclosure. The elongated housing 31 contains the required batteries 111, electrical components 1203, electric motor 112, mechanical transmission 1205, and guide slot 1206a for each of the three linear slide rods. Said batteries transfer electrical current into a DPDT three-way switch 35. Said switch is operated by the user to enable/disable/reverse direction of electrical current flow through said motor 112. Said motor output shaft 1208 is rigidly fixed to an output pinion gear 113. Said pinion gear is operatively coupled to a two stage planetary gear box 114. Said gearbox output is operatively coupled to a first barrel cam 115. A second barrel cam 116 is operatively coupled to said first barrel cam by mean of a transmission rod 1205. A third barrel cam 117 is also operatively coupled to said first barrel cam 1211 by said transmission 1205. Said transmission 1205 is operatively coupled to a mode selection switch 34. Said mode selection switch 34 is operated by the user and causes said transmission 1205 to move in a manner to vary the rotational phase relationship between said first barrel cam 115 and said second barrel cam 116 and the rotational phase relationship between said first barrel cam 115 and said third barrel cam 117. Said transmission movement may occur while all mechanical transmission components are moving. Said first barrel cam 115 contains a suitably designed drive interface 1215, such as a slot, that is operatively coupled to a first linear slide rod 1111.

Said second barrel cam 116 contains a suitably designed drive interface 117, such as a slot, that is operatively coupled to a second linear slide rod 1110. Said third barrel cam 117 contains a suitably designed interface 1219, such as a slot, operatively coupled to a third linear slide rod (not shown in this figure). Said linear slide rods 1111 and 1110 (and one not shown in this figure) each translate in an up and down motion synchronously with their respective barrel cams 115, 116, and 117, respectively. The distal ends of said linear slide rods are operatively coupled to a mechanism assembly 32. The movable component 1223 contains another elongated body forming the bristle head of a toothbrush 1224. Said toothbrush bristle head moves in various spatial trajectories 73, 74, 75, as shown in FIG. 7 dependent upon the position of said mode selection switch 34. Note that moving said selection switch 34 to a first position causes said transmission 1205 to move in a manner as to cause the slide rods 1111 and 1110 to have the phase relationship as shown in FIG. 8. Moving said selection switch 1214 to a second position causes said transmission 1205 to move in a manner to vary the phase relationship of slide rods 1111 and 1110 in the manner as shown in FIG. 9. Moving said selection switch to a third position causes transmission 1205 to move in a manner to cause the phase relationships of slide rods 1111 and 1110 in the manner as shown in FIG. 10. Those skilled in the art understand that there are an infinite number of possible joint motion combination which exist and the FIGS. 8, 9, and 10 illustrate just a small subset of these possible combinations.

Where applicable, the present embodiments of the invention can be realized in hardware, software or a combination of hardware and software. Any kind of computer system or other apparatus adapted for carrying out the methods described herein are suitable. A typical combination of hardware and software can be a mobile communications device with a computer program that, when being loaded and executed, can control the mobile communications device such that it carries out the methods described herein. Portions of the present method and system may also be embedded in a computer program product, which comprises all the features enabling the implementation of the methods described herein and which when loaded in a computer system, is able to carry out these methods.

Figure 13:
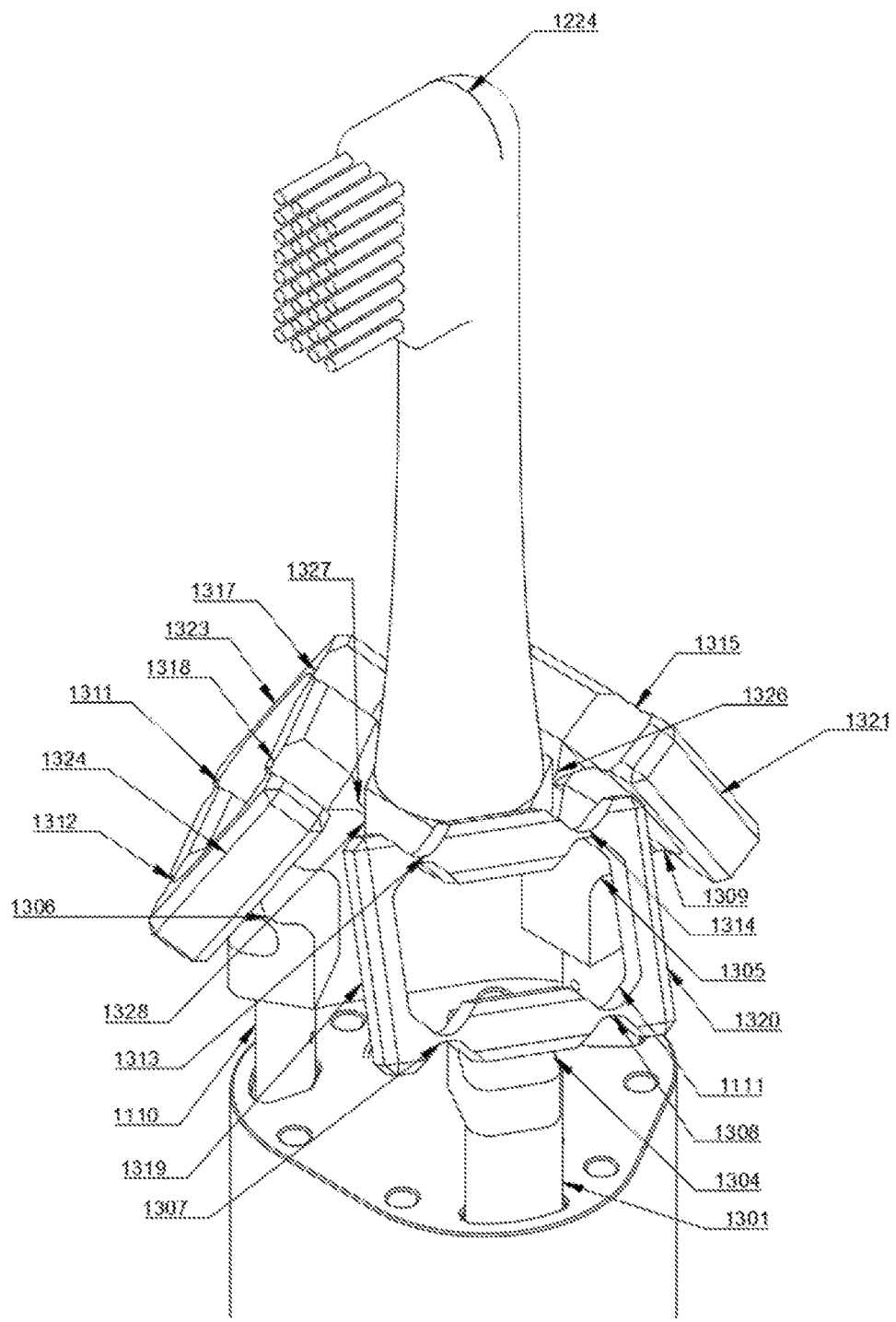
FIG. 13 is a partial perspective view of a toothbrush, with flexures as pivot joints, according to selected embodiments of the current disclosure.

FIG. 13 is a partial perspective view of a toothbrush, with flexures as pivot joints, according to selected embodiments of the current disclosure. Actuator rods 1301, 1110, and 1111 are operatively coupled to transverse flexure elements 1304, 1305, and 1306 respectively. Each transverse flexure is operatively coupled to two orthogonal flexures 1307,1308, 1309, 1311, and 1312. Said flexures are operatively coupled to pairs of flexures 1313, 1314, 1315, 1317 and 1318. These two sets of flexures and rigid intermediate members 1319, 1320, 1321, 1323, 1324 forms the parallelogram linkages similar to that as described in prior art U.S. Pat. No. 4,976,582. The distal end of each said parallelogram linkage set contains a final perpendicular flexure 1326 and 1327. Said final flexures 1326 and 1327 are all coupled to a single rigid member forming the movable body. Said rigid body contains a distal member 1224 forming a typical toothbrush head.

Figure 14:
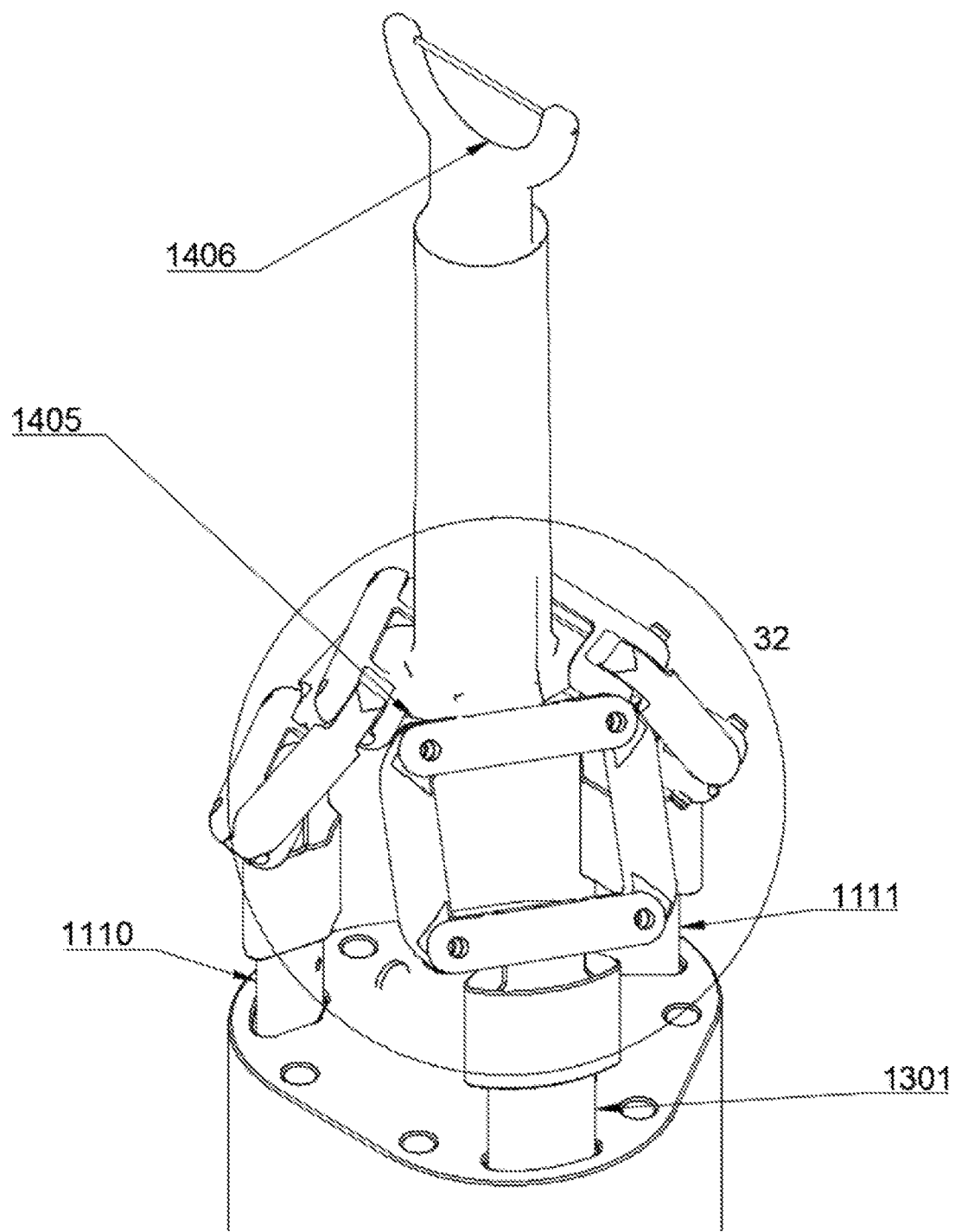
FIG. 14 is a partial perspective view of a flossing attachment for a toothbrush according to selected embodiments of the current disclosure.
Figure 15A:
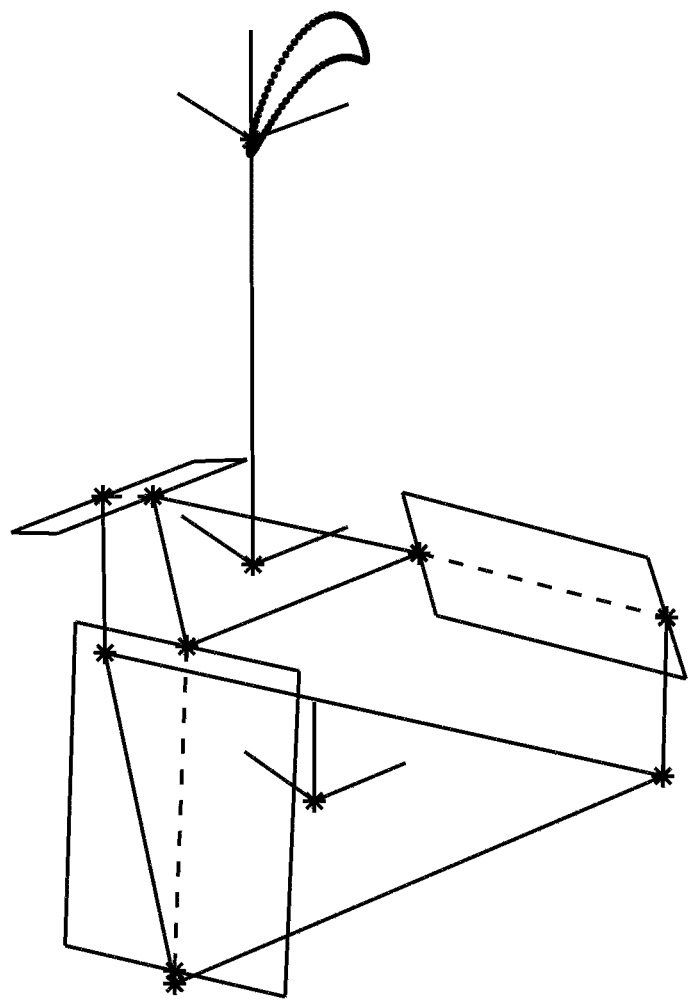
FIG. 15A is an illustration of a possible motion trajectory of the tool center point frame of a toothbrush according to selected embodiments of the current disclosure.
Figure 15B:
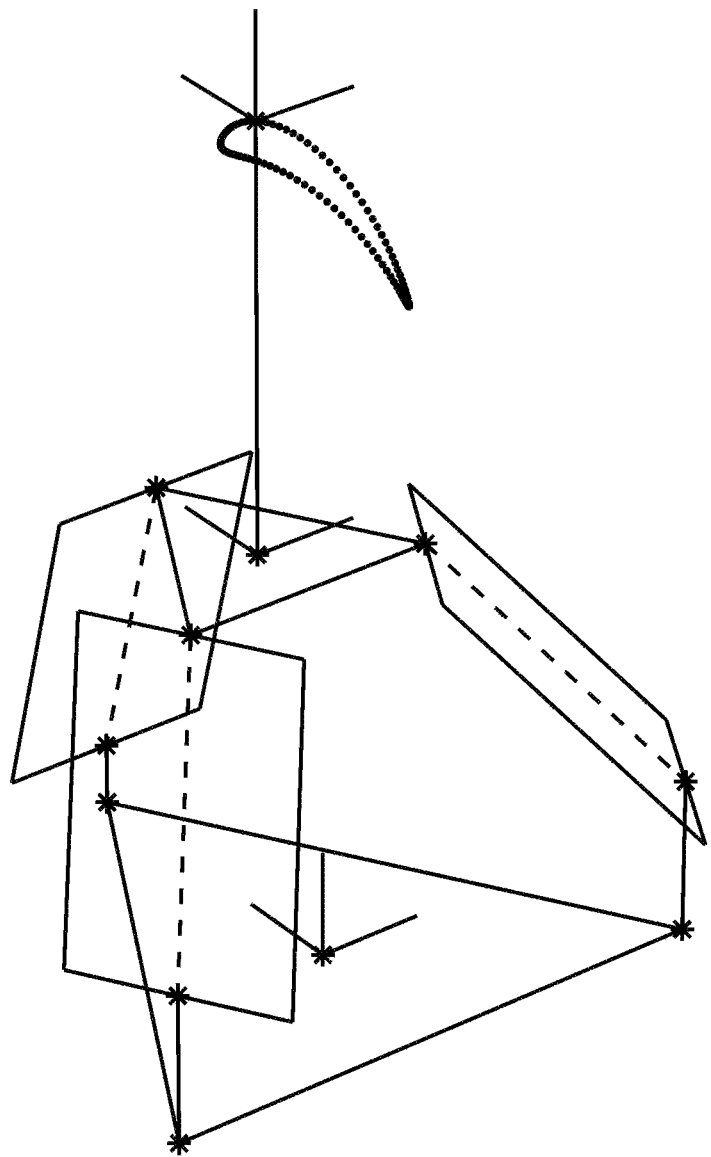
FIG. 15B is an illustration of another possible motion trajectory of the tool center point frame of a toothbrush according to selected embodiments of the current disclosure.
Figure 15C:
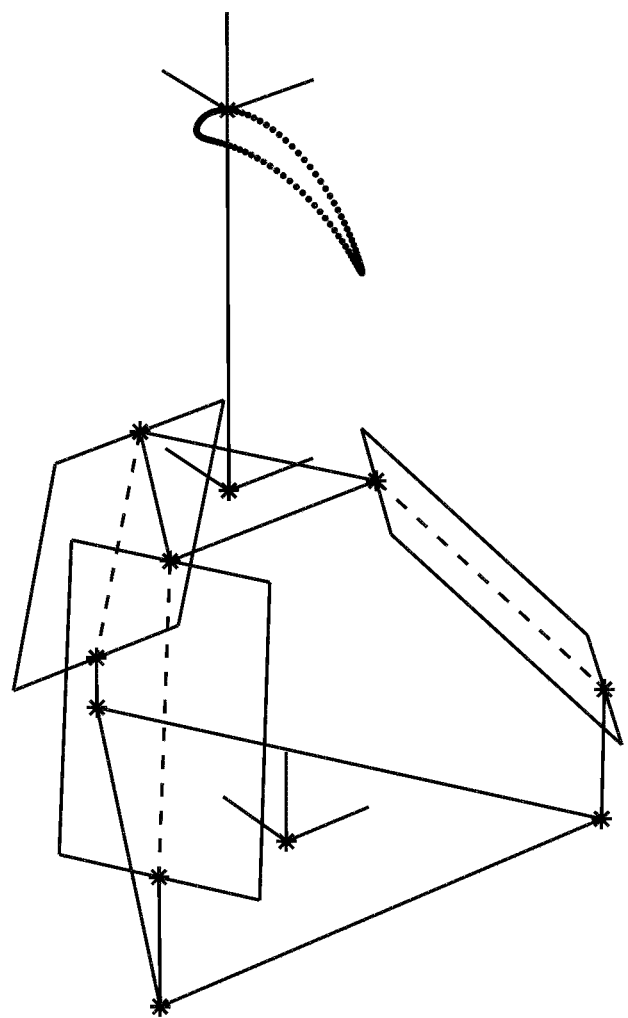
FIG. 15C is an illustration of another possible motion trajectory of the tool center point frame of a toothbrush according to selected embodiments of the current disclosure.
Figure 15D:
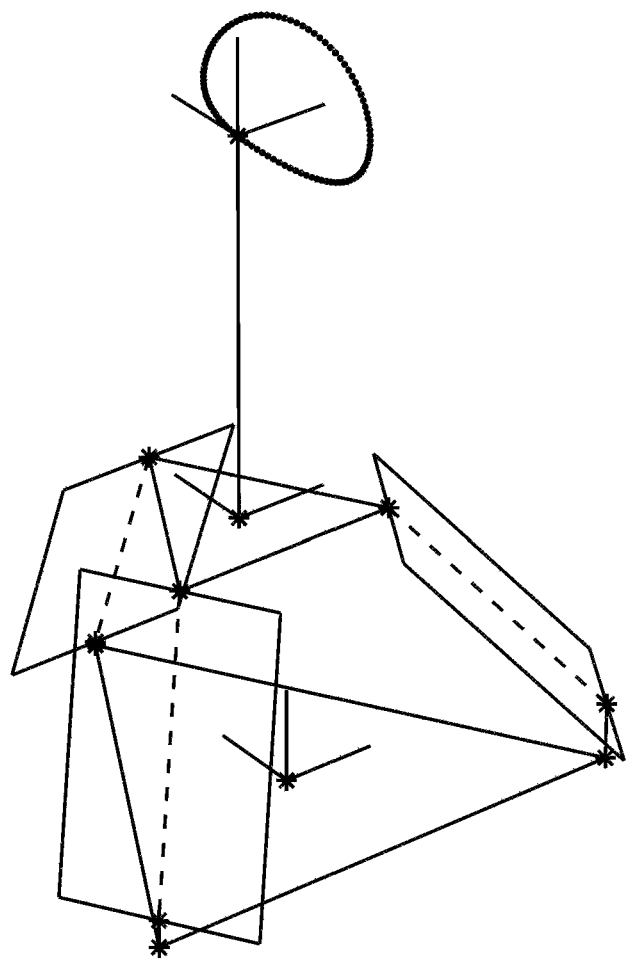
FIG. 15D is an illustration of another possible motion trajectory of the tool center point frame of a toothbrush according to selected embodiments of the current disclosure.

FIG. 14 is a partial perspective view of a flossing attachment for a toothbrush according to selected embodiments of the current disclosure. The mechanism annotated 32, is operatively coupled to slider rods 1301, 1111, and 1110. The movable body 1405 is rigidly coupled to a typical flossing head 1406. It is understood that in this alternate embodiment the movable body 1405 is capable of moving as described in prior descriptions.

FIGS. 15A, 15B, 15C, and 15D illustrate different possible motion trajectories of the tool center point (TCP) frame of the present invention.

While various embodiments of the present invention have been described above, it should be understood that they have been presented by way of example only, and not of limitation.

Likewise, the various diagrams may depict an example architectural or other configuration for the invention, which is provided to aid in understanding the features and functionality that can be included in the invention. The invention is not restricted to the illustrated example architectures or configurations, but the desired features can be implemented using a variety of alternative architectures and configurations.

Indeed, it will be apparent to one of skill in the art how alternative functional configurations can be implemented to implement the desired features of the present invention. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

What is claimed is:

1. A toothbrush comprising
a motor operatively coupled to a first barrel cam,
a second barrel cam and a third barrel cam operatively connected to the first barrel cam by a transmission rod,
a first linear slide rod operatively coupled to the first barrel cam, a second linear slide rod operatively coupled to the second barrel cam, and a third linear slide rod operatively coupled to the third barrel cam, and
a distal end assembly, where the distal end assembly is operatively coupled to the first linear slide rod, second linear slide rod, and third linear slide rod.

2. The toothbrush of claim 1, wherein the motor is operatively connected to the first barrel cam via a planetary gear box.

3. The toothbrush of claim 2, wherein the motor is operatively connected to the first barrel cam further via an output shaft rigidly fixed to an output pinion gear.

4. The toothbrush of claim 2, where the planetary gear box is a two stage planetary gear box.

5. The toothbrush of claim 1, wherein the motor is a direct current motor.

6. The toothbrush of claim 1, further comprising a battery electrically coupled to a three-way switch, where the three-way switch selectively enables, disables, and reverses direction of electrical current flow provided to the motor from the battery.

7. The toothbrush of claim 1, wherein the first barrel cam has a drive slot that operatively couples to the first linear slide rod; wherein the second barrel cam has a drive slot that operatively couples to the second linear slide rod; and wherein the third barrel cam has a drive slot that operatively couples to the third linear slide rod.

8. The toothbrush of claim 1, further comprising a mode selection switch operatively coupled to the transmissions rod that varies the rotational phase relationship between the first barrel cam and the second barrel cam as well as varies the rotational phase relationship between the first barrel cam and the third barrel cam.

9. The toothbrush of claim 1, wherein the distal end assembly is operatively coupled to the first linear slide rod via a first flexure assembly, wherein the distal end assembly is operatively coupled to the second linear slide rod via a second flexure assembly, and wherein the distal end assembly is operatively coupled to the third linear slide rod via a third flexure assembly.

10. The toothbrush of claim 9, wherein the first flexure assembly, second flexure assembly, and third flexure assembly each comprise a transverse flexure operatively coupled to two orthogonal flexures, which in turn are operatively coupled to corresponding flexures via a rigid intermediate member.

11. The toothbrush of claim 1, wherein the distal end assembly is operatively coupled to the first linear slide rod via pin connections.

12. The toothbrush of claim 1, further comprising a first guide slot that houses and restricts lateral movement of a portion of the first linear slide rod; a second guide slot that houses and restricts lateral movement of a portion of the second linear slide rod; and a third guide slot that houses and restricts lateral movement of a portion of the third linear slide rod.

13. The toothbrush of claim 1, wherein the distal end assembly comprises an elongated body.

14. The toothbrush of claim 13, wherein the elongated body is a bristle head.

15. The toothbrush of claim 13, wherein the elongated body is a flossing head.

16. A toothbrush comprising
a motor operatively coupled to a first barrel cam,
a second barrel cam and a third barrel cam operatively connected to the first barrel cam by a transmission rod,
a first linear slide rod have a drive slot operatively coupled to the first barrel cam, a second linear slide rod having a drive slot operatively coupled to the second barrel cam, and a third linear slide rod having a drive slot operatively coupled to the third barrel cam,
a distal end assembly, where the distal end assembly is operatively coupled to the first linear slide rod, second linear slide rod, and third linear slide rod, and
a mode selection switch operatively coupled to the transmissions rod that varies the rotational phase relationship between the first barrel cam and the second barrel cam as well as varies the rotational phase relationship between the first barrel cam and the third barrel cam.

17. The toothbrush of claim 16, wherein the motor is operatively connected to the first barrel cam via an output shaft rigidly fixed to an output pinion gear and a two stage planetary gear box.

18. The toothbrush of claim 16, further comprising a battery electrically coupled to a three-way switch, where the three-way switch selectively enables, disables, and reverses direction of electrical current flow provided to the motor from the battery.

19. The toothbrush of claim 16, wherein the distal end assembly is operatively coupled to the first linear slide rod via a first flexure assembly, wherein the distal end assembly is operatively coupled to the second linear slide rod via a second flexure assembly, and wherein the distal end assembly is operatively coupled to the third linear slide rod via a third flexure assembly, where the first flexure assembly, second flexure assembly, and third flexure assembly each comprise a transverse flexure operatively coupled to two orthogonal flexures, which in turn are operatively coupled to corresponding flexures via a rigid intermediate member.

20. The toothbrush of claim 16, further comprising a first guide slot that houses and restricts lateral movement of a portion of the first linear slide rod; a second guide slot that houses and restricts lateral movement of a portion of the second linear slide rod; and a third guide slot that houses and restricts lateral movement of a portion of the third linear slide rod.

21. The toothbrush of claim 16, wherein the distal end assembly comprises a bristle head.

* * * * *

UNITED STATES PATENT AND TRADEMARK OFFICE
CERTIFICATE OF CORRECTION

| | | |
|---|---|---|
| PATENT NO. | : 11,517,411 B2 | |
| APPLICATION NO. | : 16/643639 | |
| DATED | : December 6, 2022 | |
| INVENTOR(S) | : Scott D. Nortman | |

It is certified that error appears in the above-identified patent and that said Letters Patent is hereby corrected as shown below:

On the Title Page

Item (12) should read:
Nortman

Item (72) should read:
Scott D. Nortman

Signed and Sealed this
Twenty-seventh Day of August, 2024

Katherine Kelly Vidal
*Director of the United States Patent and Trademark Office*